United States Patent
Kim et al.

[11] Patent Number: 5,942,154
[45] Date of Patent: Aug. 24, 1999

[54] LIQUID CRYSTAL DISPLAY DEVICE AND MANUFACTURING METHOD THEREOF

[75] Inventors: Si-hwan Kim; Seung-bae Lee, both of Seoul; Jin-woo Park, Suwon, all of Rep. of Korea

[73] Assignee: Samsung Display Devices Co., Ltd., Kyungki-do, Rep. of Korea

[21] Appl. No.: 08/927,543

[22] Filed: Sep. 11, 1997

[30] Foreign Application Priority Data

Oct. 28, 1996 [KR] Rep. of Korea ............. 96-49312
Oct. 28, 1996 [KR] Rep. of Korea ............. 96-49319

[51] Int. Cl.$^6$ ............. C09K 19/52; G02F 1/1335; G02F 1/133
[52] U.S. Cl. ............. 252/299.01; 349/73; 349/86; 349/115; 349/176; 349/183; 349/185; 349/186
[58] Field of Search ............. 252/299.01; 349/115, 349/168, 194, 73, 176, 183, 185, 186, 86

[56] References Cited

U.S. PATENT DOCUMENTS

| | | | |
|---|---|---|---|
| 4,073,571 | 2/1978 | Grinberg et al. | 349/194 |
| 4,536,059 | 8/1985 | Van Den Berk | 349/168 |
| 5,221,982 | 6/1993 | Faris | 349/115 |

*Primary Examiner*—Shean C. Wu
*Attorney, Agent, or Firm*—Leygid, Voit & Mayer, Ltd.

[57] ABSTRACT

A liquid crystal display having a liquid crystal mixture of cholesteric and nematic liquid crystal materials and a method of manufacturing the display. A polymer-liquid crystal mixture, obtained by mixing a mixture of cholesteric and nematic liquid crystals with a polymer compound, is sealed in a plurality of cells between two substrates having respective electrodes. Various mixtures are used in different cells so that different colors can be displayed.

33 Claims, 2 Drawing Sheets

LIQUID CRYSTAL DISPLAY DEVICE AND MANUFACTURING METHOD THEREOF

BACKGROUND OF THE INVENTION

1. Field of the Invention

The present invention relates to a liquid crystal display (LCD) and a manufacturing method thereof, and more particularly, to a reflective LCD containing a liquid crystal mixture of cholesteric and nematic liquid crystals and a manufacturing method thereof.

2. Description of the Related Art

LCDs include a dynamic scattering mode (DSM) LCDs and LCDs relying on phase shift effects the latter LCDs have a liquid crystal layer which includes a polymer layer formed of a mixture of cholesteric and nematic liquid crystals (hereinafter, referred to as cholesteric-nematic liquid crystal mixture), without polarizers plates purposes. Use of the DSM LCD is extremely limited due to its low response speed and large thickness relative to other LCDS. On the other hand, an LCD using a cholesteric-nematic liquid crystal mixture can use simple matrix driving and exhibits a high response speed due to reaction between a polymer layer and the LCDs.

However, the LCDs using the cholesteric-nematic liquid crystal mixture, which have been developed so far, can display only a single color. That is, display of two or more colors is beyond their ability.

SUMMARY OF THE INVENTION

An object of the present invention is to provide a liquid crystal display (LCD) with a liquid crystal layer formed of a cholesteric-nematic liquid crystal mixture, for displaying at least two colors.

Another object of the present invention is to provide a manufacturing method of the LCD.

To achieve the above object, a liquid crystal display of the present invention comprises a first substrate having a first electrode formed thereon, a second substrate spaced from the first substrate and having a second electrode which faces the first electrode, and a cell array having a plurality of cells arranged in a predetermined shape between the first and second electrodes. Each cell is formed of a liquid crystal layer, i.e., a polymer-liquid crystal mixture obtained by mixing a liquid crystal mixture of cholesteric and nematic liquid crystals, and a polymer compound at a predetermined ratio.

The cholesteric liquid crystal and the nematic liquid crystal are mixed at a volume ratio of 1:0.8–1:2.2 in the liquid crystal mixture, and the nematic liquid crystal has a negative dielectric anisotropy $\Delta\in$.

A protection layer intervenes between the liquid crystal layer and the second electrode in order to protect the liquid crystal layer.

To achieve another object, in a liquid crystal display manufacturing method of the present invention, partitions are formed on a substrate having an electrode formed thereon, to define the each cell regions. A liquid crystal layer, for example, a polymer-liquid crystal mixture layer is formed, filling the space between the partitions, for reflecting a wavelength corresponding to a predetermined color. An insulation layer is formed on the polymer-liquid crystal mixture layer. A photoresist film is formed on the insulation layer to cover only necessary portions thereof. The insulation layer and the polymer-liquid crystal mixture layer are removed through wet-etching, using the photoresist film as a mask. The photoresist film is removed.

The method may further comprise repeating the above steps at predetermined times corresponding to the kinds of intended color areas.

In an embodiment of the present invention for forming the polymer-liquid crystal mixture layer, a liquid crystal mixture is formed by mixing a cholesteric liquid crystal with a nematic liquid crystal at a predetermined volume ratio. A polymer-liquid crystal mixture is formed by mixing the liquid crystal mixture with a polymer compound. The polymer-liquid crystal mixture is dissolved in a predetermined solution. The dissolved polymer-liquid crystal mixture is coated on the substrate having the electrode formed thereon. The polymer-liquid crystal mixture layer is formed by vaporizing the solution from the resultant on which the polymer-liquid crystal mixture is coated.

In another embodiment of the present invention for forming the polymer-liquid crystal mixture layer, a liquid crystal mixture is formed by mixing a cholesteric liquid crystal with a nematic liquid crystal at a predetermined volume ratio. A polymer-liquid crystal mixture is formed by mixing the liquid crystal mixture with an ultraviolet curing polymer compound at a predetermined ratio. The polymer-liquid crystal mixture is applied to the substrate including the electrode. A cured polymer-liquid crystal mixture layer is formed by irradiation with ultraviolet rays.

A liquid crystal layer can be formed to selectively reflect wavelengths corresponding to two or more colors, for example, colors Red, Green and Blue from a single panel by impregnating a polymer material with a liquid crystal mixture of cholesteric and nematic liquid crystals mixed at different volume ratios, respectively. Thus, an LCD can be provided which can display two or more colors.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Generally, in fabrication of an LCD using a cholesteric-nematic liquid crystal mixture, the reflective wavelength $\lambda$ of the LCD is expressed as the product of the average refractive index n of a nematic liquid crystal and the pitch p of a cholesteric phase of the liquid crystal mixture, that is, $\lambda = n \cdot p$.

On the basis of such a principle, a liquid crystal mixture is formed in the present invention to reflect light of a predetermined wavelength by controlling the mixing ratio of the cholesteric and nematic liquid crystals and thus the pitch p of the liquid crystal mixture. If the thus-formed liquid crystal mixture is placed between two transparent electrodes, and an electric field is applied between the electrodes, only a light of a wavelength related to the pitch of the liquid crystal mixture impregnated in a polymer is reflected.

Figure 1:
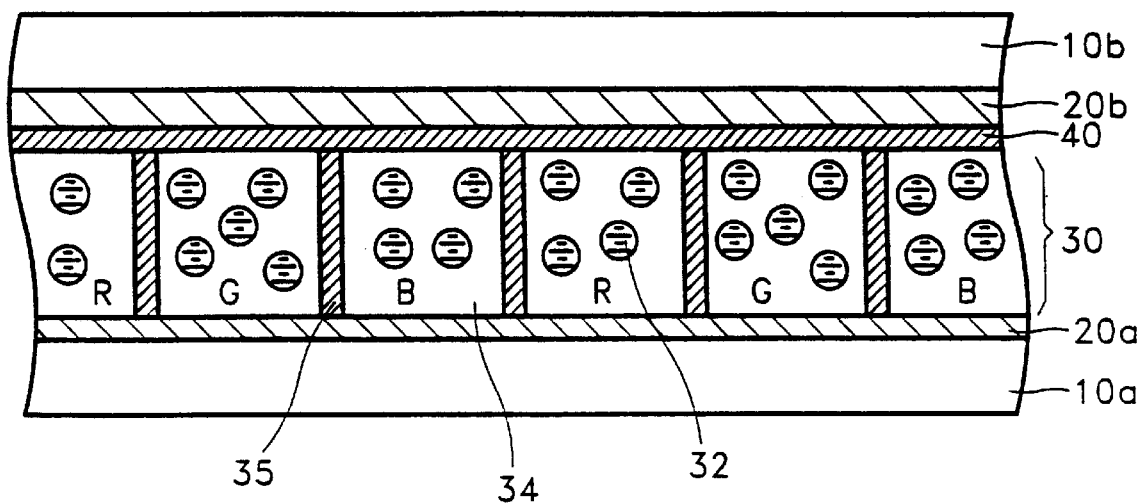
FIG. 1 is a sectional view illustrating the structure of a reflective LCD according to a preferred embodiment of the present invention.

FIG. 1 schematically illustrates an important portion of a reflective LCD according to a preferred embodiment of the present invention.

Referring to FIG. 1, the reflective LCD according to the preferred embodiment of the present invention includes a first substrate 10a having a first electrode 20a for driving a liquid crystal, display a second substrate 10b spaced from the first substrate 10a and having a second electrode 20b facing the first electrode 20a, and a cell array in which cells are separated from one another by partitions 35 between the first and second substrate 10a and 10b and arranged in a predetermined shape, each cell including a liquid crystal layer 30. The liquid crystal layer 30 is a polymer-liquid crystal mixture of a liquid crystal mixture 32 and a polymer compound 34 mixed at a predetermined ratio, and a protection layer 40 intervenes between the liquid crystal layer 30 and the second electrode 20b to protect the liquid crystal layer 30.

Here, a mixture of cholesteric and nematic liquid crystals is used as the liquid crystal mixture. The composition ratio of the cholesteric and nematic liquid crystals may be controlled so that when light impinges on the LCD, light of desired wavelengths corresponding to respective colors, for example, red, green, and blue, is reflected.

In an embodiment of the present invention, polyvinyl butyral (PVB) can be used as the polymer compound 34. Here, the polymer compound 34 is about 80–120 wt % of the liquid crystal mixture 32.

In another embodiment of the present invention, an ultraviolet curing polymer compound is used as the polymer compound 34. An ultraviolet curing polymer compound which can be used in the present invention is a compound obtained by mixing aromatic urethane acrylate, 2-hydroxyethyl methacrylate, and 2-ethylhexyl acrylate at a predetermined weight ratio. When necessary, the polymer compound may further contain trimethylol propane triacrylate. In addition, the polymer compound may further contain a photoinitiator in order to be hardened by ultraviolet rays.

For example, the polymer-liquid crystal mixture may contain aromatic urethane acrylate of 10–25 wt % 2-hydroxyethyl methacrylate of 2–10 wt %, 2-ethylhexyl acrylate of 2–10 wt %, and a liquid crystal mixture of 50–70 wt % based on the total weight of the polymer-liquid crystal mixture. Or the polymer-liquid crystal mixture may contain aromatic urethane acrylate of 10–25 wt %, 2-hydroxyethyl methacrylate of 2–10 wt %, 2-ethylhexyl acrylate of 2–10 wt %, trimethylol propane triacrylate of 2–10 wt %, and a liquid crystal mixture of 50–70 wt % as based on the total weight of the polymer-liquid crystal mixture.

Moreover, the liquid crystal mixture is about 50–70 wt %, preferably, 60–70 wt % based on the total weight of the polymer-liquid crystal mixture in the polymer-liquid crystal mixture including the ultraviolet curing polymer compound.

The pitches of liquid crystals in the liquid crystal mixture are adjusted corresponding to respective colors so that at least two colors can be displayed by the cholesteric-nematic liquid crystal mixture. Thus, wavelengths of colors corresponding to red, green, and blue can be controlled to be reflected, respectively.

The cholesteric liquid crystal and the nematic liquid crystal are mixed at a volume ratio of about 1:0.8–1:2.2 in the liquid crystal mixture. Here, the volume ratio for reflecting red light is about 1:1.7–1:2.2, preferably, 1:1.94 in the liquid crystal mixture, the volume ratio for reflecting green light is about 1:1.2–1:1.7, preferably, 1:1.5 in the liquid crystal mixture, and the volume ratio for reflecting blue light is about 1:0.8–1:1.2, preferably, 1:1 in the liquid crystal mixture.

Here, the nematic liquid crystal preferably has a negative dielectric anisotropy $\Delta\varepsilon$ so that when the liquid crystal layer is formed of the liquid crystal mixture and subjected to an electric field, liquid crystal molecules are directed at the right angle to the electric field.

In the present invention, the intensity of a reflected wavelength can be controlled by controlling the pitch of a cholesteric phase in the liquid crystal mixture so that a wavelength corresponding to a desired color can be reflected. Here, as the content of liquid crystals in the polymer-liquid crystal mixture increases, the driving voltage of the LCD can be lowered.

In addition, the partitions 35 for separating each cell of the cell array in the liquid crystal layer 30 may be polyimide, and the protection layer 40 may be a silicon oxide.

Figure 2:
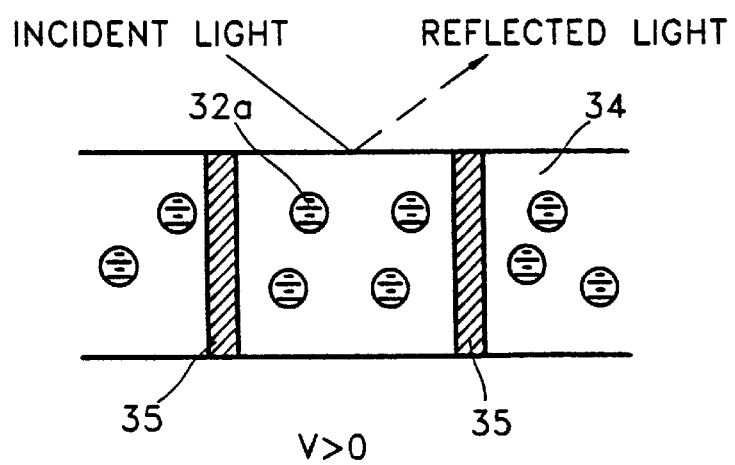
FIG. 2 illustrates the state of a liquid crystal layer when an electric field is applied to the LCD of FIG. 1.

FIG. 2 illustrates the state of the liquid crystal layer when an electric field is applied to the LCD of the present invention shown in FIG. 1. As shown in FIG. 2, when a predetermined voltage V is applied between both electrodes of the LCD, the rotational axis of liquid crystal molecules in the liquid crystal mixture 32a is perpendicular to the surfaces of the substrates 10a and 10b (see FIG. 1), and when light is incident, a wavelength is reflected according to the pitch of the liquid crystal mixture.

In the LCD of the present invention, the liquid crystal mixture for reflecting color red, green or blue is patterned into individual cells separated from one another by the partitions. Therefore, various colors can be selectively displayed when the electric field is applied to both electrodes.

Figure 3:
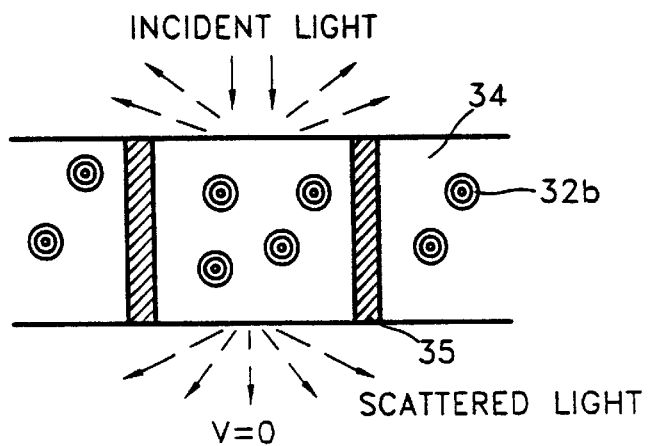
FIG. 3 illustrates the state of the liquid crystal layer when no electric field is applied to the LCD of FIG. 1.

FIG. 3 illustrates the state of the liquid crystal layer when no electric field is applied to the LCD of the present invention. As shown in FIG. 3, incident light is scattered when no voltage is applied between the electrodes, and if the scattered light is transmitted through the liquid crystal mixture 32b and the polymer compound 34, the light reaches an absorbing plate (not shown) located behind the substrates, thus appearing black.

Now, a method for manufacturing the thus-constituted LCD according to the present invention will be described in detail.

Figure 4:
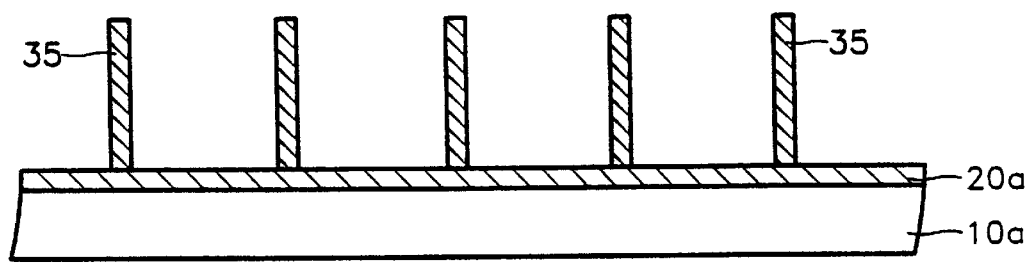
FIGS. 4 and 5 are sectional views illustrating an LCD manufacturing method according to a preferred embodiment of the present invention.
Figure 5:
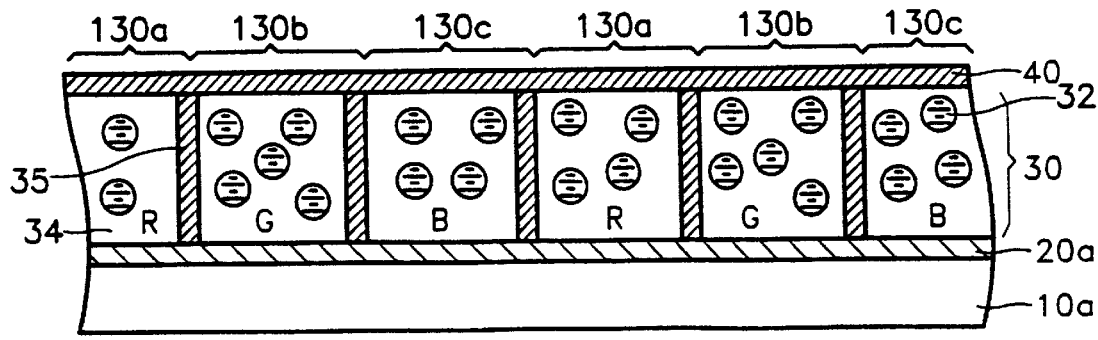

FIGS. 4 and 5 are sectional views for illustrating the LCD manufacturing method according to a preferred embodiment of the present invention.

Referring to FIG. 4, after a transparent conductive layer of indium tin oxide (ITO) is applied to the first substrate 10a, the first electrode 20a for driving liquid crystals is formed by patterning the transparent conductive layer. Then, a partition-forming material layer, for example, a polyimide layer, is formed on the first electrode 20a to a predetermined thickness. Next, the partitions 35 are formed by patterning the partition-forming material layer.

Referring to FIG. 5, to form one of red, green and blue areas, for example, a red area, the red area polymer-liquid crystal mixture layer 130a containing the liquid crystal mixture 32 and the polymer compound 34 mixed at a predetermined weight ratio is prepared for filling the spaces among the partitions 35. The liquid crystal mixture 32 is formed by mixing a cholesteric liquid crystal with a nematic liquid crystal at an appropriate volume ratio using a conventional method to adjust the pitch of the mixture, in order to obtain a reflected light having a desired wavelength corresponding to red. Here, the materials mentioned above are used for the liquid crystal mixture 32 and the polymer compound 34.

Here, in case PVB is used for the polymer compound 34, the polymer-liquid crystal mixture is prepared by mixing the liquid crystal mixture 32 with PVB in a volume ratio of 1:1, and dissolved in a solvent, preferably, chloroform. The dissolved polymer-liquid crystal mixture is applied to the structure of FIG. 4. Then, a red area polymer liquid crystal mixture layer 130*a* is formed by heating the mixture to about 130–170° C. and vaporizing the solution.

Alternatively, when ultraviolet cured polymer compound is used as the polymer compound 34, the red area polymer-liquid crystal mixture layer 130*a* is mixing by forming a polymer-liquid crystal mixture of the liquid crystal mixture 32 and the ultraviolet curing polymer compound in the above-described ratio, and curing the polymer-liquid crystal mixture by means with irradiation of ultraviolet rays.

Subsequently, a silicon oxide layer is formed as an insulation layer on the red area polymer-liquid crystal mixture layer 130*a*. Then, a photoresist film (not shown) is formed only on necessary parts of the insulation layer to. The insulation layer and the polymer-liquid crystal mixture layer 130*a*, excluding the portions covered with the photoresist film, are removed by wet-etching. The photoresist film is removed. Thus, the insulation layer 40 and the red area polymer-liquid crystal mixture layer 130*a* remain only in the necessary portions, thereby forming a cell for red covered with a protection layer including the insulation layer, 40.

Then, in the same manner as that for forming the red area, a green area polymer-liquid crystal mixture layer 130*b* and a blue area polymer-liquid crystal mixture layer 130*c* are sequentially formed and covered with the protection layer the insulation layer 40, using polymer-liquid crystal mixtures at the mixture ratios described above as necessary for green and blue areas, respectively.

When the above processes are completed, the liquid crystal layer 30 having a cell array which includes cells for the red, green and blue areas, and the protection layer 40 for covering the liquid crystal layer 30 are completed.

Then, the second substrate 10*b* having the second transparent electrode 20*b* is assembled on the protection layer 40. Thus, the LCD of the present invention shown in FIG. 1 is completed.

Here, the partitions 35 and the protection layer 40 serve to protect liquid-crystal-impergnated in polymers. That is, the partitions 35 and the protection layer 40 serve to prevent the liquid crystals impregnated in the polymers of necessary portions from being extracted during the wet-etching for removing unnecessary portions of the polymer-liquid crystal mixture layer and the protection layer. In addition, since the protection layer 40 is an insulation layer such as a silicon oxide, it reinforces electrical characteristics of both facing electrodes 20*a* and 20*b* of the LCD by isolating the electrodes 20*a* and 20*b* from each other and thus preventing a short between them.

As described above, the LCD of the present invention can display two or more colors, using a cholesteric-nematic liquid crystal mixture whose pitch is adjusted so that the wavelength of a desired color is reflected.

Though the present invention has been described in detail with the specific embodiments, they are mere examples. Thus, the present invention is not limited to the described embodiments, and it is clearly understood that many variations can be made within the scope and spirit of the present invention by anyone skilled in the art.

We claim:

1. A liquid crystal display comprising:
   a first substrate including a first electrode,
   a second substrate spaced from the first substrate, the second substrate having a second electrode facing the first electrode, and
   a cell array having a plurality of cells arranged side-by-side between the first and second electrodes, cells being mutually separated by partitions extending transverse to the first and second electrodes, each cell containing a polymer-liquid crystal mixture including a mixture of cholesteric and nematic liquid crystal materials and a polymer compound first and second cells of the cell array respectively containing different first and second polymer-liquid crystal mixtures respectively reflecting light of first and second, different wavelengths when subjected to an electric field applied across the first and second electrodes.

2. The device of claim 1, wherein the polymer compound is polyvinyl butyral.

3. The device of claim 2, wherein the cholesteric liquid crystal and the nematic liquid crystal are mixed in a volume ratio within the range of 1:0.8–1:2.2 in the polymer-liquid crystal mixtures.

4. The device of claim 2, wherein the nematic liquid crystal has a negative dielectric anisotropy $\Delta\in$.

5. The device of claim 2, wherein the polymer compound is at about 80–120 wt % of the liquid crystal mixture.

6. The device of claim 1, wherein the partitions are polyimide.

7. The device of claim 2, including a protection layer between the liquid crystal layer and the second electrode for protecting the liquid crystal layer.

8. The device of claim 7, wherein the protection layer is formed of a silicon oxide.

9. The device of claim 1, wherein the polymer compound is an ultraviolet light cured polymer compound.

10. The device of claim 9, wherein the ultraviolet cured polymer compound includes aromatic urethane acrylate, 2-hydroxyethyl methacrylate, and 2-ethylhexyl acrylate.

11. The device of claim 10, wherein the ultraviolet cured polymer compound further includes a photoinitiator.

12. The device of claim 9, wherein the ultraviolet cured polymer compound further includes trimethylol propane triacrylate.

13. The device of claim 12, wherein the ultraviolet cured polymer compound further includes a photoinitiator.

14. The device of claim 9, wherein the polymer-liquid crystal mixture includes a liquid crystal mixture at about 50–70 wt % based on the total weight of the polymer-liquid crystal mixture.

15. The device of claim 9, including a protection layer intervenes between the liquid crystal layer and the second electrode.

16. The device of claim 15, wherein the protection layer is a silicon oxide.

17. A method of manufacturing a liquid crystal display, comprising:

(1) forming partitions on an electrode on a substrate, partitions separating respective cells from each other;

(2) filling the cells between the partitions, with a polymer-liquid crystal mixture for reflecting a wavelength corresponding to a particular color;

(3) forming an insulating layer on the polymer-liquid crystal mixture layer;

(4) forming a photoresist film on the insulating layer covering only portions of the insulating layer;

(5) forming respective color areas by removing the insulating layer and the polymer-liquid crystal mixture layer by wet-etching, using the photoresist film as a mask; and (6) removing the photoresist film.

18. The method of claim 17, wherein the step (1) comprises the substeps of:

forming a partition-forming material layer on the electrode and forming partitions by patterning the partition-forming material layer.

19. The method of claim 18, wherein the partition-forming material is polyimide.

20. The method of claim 17, wherein the particular color is selected from a group consisting of colors red, green, and blue.

21. The method of claim 17, wherein the steps (2)–(6) are performed at times corresponding to the kinds of color areas.

22. The method of claim 17, wherein the step (2) comprises the substeps of;

forming a liquid crystal mixture of cholesteric and nematic liquid crystals mixed in a predetermined ratio;

forming a polymer-liquid crystal mixture by mixing the liquid crystal mixture with a polymer compound in a predetermined ratio;

dissolving the polymer-liquid crystal mixture in a solvent;

coating the substrate with the dissolved polymer-liquid crystal mixture; and forming a polymer-liquid crystal mixture layer by heating the polymer-liquid crystal mixture coating solvent.

23. The method of claim 22, including mixing the cholesteric liquid crystal with the nematic liquid crystal in a volume ratio of 1:0.8–1:2.2.

24. The method of claim 22, wherein the polymer compound is polyvinyl butyral.

25. The method of claim 22, including mixing the liquid crystal mixture with the polymer compound at a volume ratio of 1:1 in the substep of forming the polymer-liquid crystal mixture.

26. The method of claim 22, wherein the solvent is chloroform.

27. The method of claim 22, wherein the heating temperature is 130–170° C.

28. The method of claim 17, wherein the step (2) comprises the substeps of:

forming a liquid crystal mixture of a cholesteric liquid crystal and a nematic liquid crystal in a predetermined ratio;

forming a polymer-liquid crystal mixture by mixing the liquid crystal mixture with an ultraviolet-cured polymer compound in a predetermined ratio;

coating the substrate with the polymer-liquid crystal mixture; and forming a cured polymer-liquid crystal mixture layer by irradiating the substrate with ultraviolet rays.

29. The method of claim 28 including mixing the cholesteric liquid crystal with the nematic liquid crystal at a volume ratio of 1:0.8–1:2.2.

30. The method of claim 28, wherein the polymer-liquid crystal mixture includes aromatic urethane acrylate of 10–25 wt %, 2-hydroxyethyl methacrylate of 2–10 wt %, 2-ethylhexyl acrylate of 2–10 wt %, and a liquid crystal mixture of 50–70 wt % based on the total weight of the polymer-liquid crystal mixture.

31. The method of claim 28, wherein the polymer-liquid crystal mixture includes aromatic urethane acrylate of 10–25 wt %, 2-hydroxyethyl methacrylate of 2–10 wt %, 2-ethylhexyl acrylate of 2–10 wt %, trimethylol propane triacrylate of 2–10 wt %, and a liquid crystal mixture of 50–70 wt % as based on the total weight of the polymer-liquid crystal mixture.

32. The device of claim 1 wherein the cell array includes at least one cell reflecting red light, at least one cell reflecting green light, and at least one cell reflecting blue light.

33. The device of claim 32 wherein the cholesteric liquid crystal and the nematic liquid crystal are mixed in respective volume ratios in the ranges of 1:1.7–1:2.2, 1:1.2–1:1.7, and 1:0.8–1:1.2 in the cells reflecting red, green, and blue light, respectively.

* * * * *